United States Patent
Waddell (10) Patent No.: US 10,073,055 B2
(45) Date of Patent: Sep. 11, 2018

(54) ION DETECTOR FOR MEASURING ION OUTPUT

(71) Applicant: Charles Houston Waddell, Roanoke, VA (US)

(72) Inventor: Charles Houston Waddell, Roanoke, VA (US)

(73) Assignee: Global Plasma Solutions, LLC, Savannah, GA (US)

( * ) Notice: Subject to any disclaimer, the term of this patent is extended or adjusted under 35 U.S.C. 154(b) by 475 days.

(21) Appl. No.: 14/165,071

(22) Filed: Jan. 27, 2014

(65) Prior Publication Data

US 2014/0209799 A1    Jul. 31, 2014

Related U.S. Application Data

(60) Provisional application No. 61/756,591, filed on Jan. 25, 2013.

(51) Int. Cl.
| | | |
|---|---|---|
| *G01N 27/62* | (2006.01) | |
| *F24F 11/30* | (2018.01) | |
| *F24F 110/50* | (2018.01) | |
| *F24F 110/80* | (2018.01) | |
| *F24F 110/66* | (2018.01) | |

(52) U.S. Cl.
CPC .............. *G01N 27/62* (2013.01); *F24F 11/30* (2018.01); *F24F 2110/50* (2018.01); *F24F 2110/66* (2018.01); *F24F 2110/80* (2018.01); *Y02A 50/249* (2018.01); *Y02B 30/78* (2013.01)

(58) Field of Classification Search
None
See application file for complete search history.

(56) References Cited

U.S. PATENT DOCUMENTS 3,734,342 A     5/1973   Patterson
4,056,772 A *  11/1977   Graf von Berckheim ..................
                                                              G01N 27/60
                                                                  324/72

(Continued)

OTHER PUBLICATIONS

Todd, "The Potentiometer Handbook," McGraw Hill Company, Published 1975, Retrieved from the Internet [Dec. 29, 2017]; Retrieved from URL <file:///C:/Users/ygreen/Documents/e-Red%20Folder/14165071/OnlinePotentiometerHandbook.pdf>.*

(Continued)

*Primary Examiner* — Yara B Green
(74) *Attorney, Agent, or Firm* — Seth L. Hudson; Clements Bernard Walker, PLLC (57) ABSTRACT

The present invention provides methods and systems for an apparatus for the detection of ions that include a housing containing a top portion and a bottom portion, wherein the bottom portion contains a base that extends to an outer edge from which first and second pairs of spaced-apart, opposed sidewalls project upwards from the outer edge to collectively form an interior storage compartment therein. The sidewalls each have an inner and outer sidewall surfaces and each of the second pair of sidewalls interconnect the first pair of sidewalls to define corners and an interior storage compartment and an upper rim is contained on each sidewall for engaging and supporting the top portion. A circuit board is contained within the interior storage compartment, and an antenna for detecting the ions extends from the top portion.

19 Claims, 7 Drawing Sheets

(56) References Cited

U.S. PATENT DOCUMENTS

| | | | |
|---|---|---|---|
| 4,901,194 A * | 2/1990 | Steinman | H01T 23/00 |
| | | | 250/423 R |
| 7,183,772 B1 * | 2/2007 | Sainty | G01N 27/66 |
| | | | 324/457 |
| 2008/0202335 A1 | 8/2008 | McKinney | |

OTHER PUBLICATIONS

Vollono, V., Build this Negative Ion Detector, Spring 1994 Electronics Hobbyists Handbook, pp. 1-3, www.sentex.ca/~mec1995/circ/hv/niondet/niondet.html.

Innovair DH100ACDCLP Air Duct Smoke Detector with Extended Air Speed Range, Installation and Maintenance Instructions is found on Web page, www.systemsensor.com/pdf/I56-0084.pdf, 8 pages, Jun. 5, 2003, retrieved from Internet Archive Wayback Machine, https://web.archive.org/web/20030427192540/http://www.systemsensor.com/pdf/I56-0084.pdf on Feb. 4, 2015.

\* cited by examiner

ION DETECTOR FOR MEASURING ION OUTPUT

CROSS REFERENCE TO RELATED PATENT APPLICATION

The current application claims the benefit of the earlier priority filing date of the provisional application Ser. No. 61/756,591, that was filed on Jan. 25, 2013.

FIELD OF THE INVENTION

The present invention relates generally to an ion detector, and more generally relates to an ion detector for measuring ionization levels, for example in an HVAC duct.

BRIEF SUMMARY OF THE INVENTION

According to an embodiment of the present invention, an apparatus for the detection of ions includes a housing with a top portion and a bottom portion and containing an interior storage compartment. A circuit board is contained within the interior storage compartment, and an antenna captures data on the number of ions extending in the air passing around the antenna, whereby the antenna extends from the housing and is communicatively connected to the circuit board. A relay circuit is contained on the circuit board for relaying the data captured by the antenna.

According to another embodiment of the present invention, the apparatus for the detection of ions includes an LED for indicating when power is supplied to the apparatus.

According to yet another embodiment of the present invention, the apparatus for the detection of ions includes an LED for indicating when a predetermined ionization level has been reached.

According to yet another embodiment of the present invention, the apparatus for the detection of ions includes at least one potentiometer for adjusting the sensitivity of ion concentration levels.

According to yet another embodiment of the present invention, the apparatus for the detection of ions includes an attachment means on the housing.

According to yet another embodiment of the present invention, the apparatus for the detection of ions includes at least two hollow cylindrical structures contained within the interior storage compartment.

According to yet an embodiment of the present invention, an apparatus for the detection of ions includes a housing containing a top portion and a bottom portion, wherein the bottom portion contains a base that extends to an outer edge from which first and second pairs of spaced-apart, opposed sidewalls project upwards from the outer edge to collectively form an interior storage compartment therein. The sidewalls each have an inner and outer sidewall surfaces and each of the second pair of sidewalls interconnect the first pair of sidewalls to define corners and an interior storage compartment and an upper rim is contained on each sidewall for engaging and supporting the top portion. A circuit board is contained within the interior storage compartment and contains a terminal block. An antenna detects the ion level, and a power supply is engaged to the terminal block for supplying power to the apparatus.

According to yet an embodiment of the present invention, an apparatus for the detection of ions includes a speaker.

According to yet another embodiment of the present invention, the apparatus for the detection of ions includes a housing containing a top portion and a bottom portion, wherein the bottom portion contains a base that extends to an outer edge from which first and second pairs of spaced-apart, opposed sidewalls project upwards from the outer edge to collectively form an interior storage compartment therein. The sidewalls each have an inner and outer sidewall surfaces and each of the second pair of sidewalls interconnect the first pair of sidewalls to define corners and an interior storage compartment and an upper rim is contained on each sidewall for engaging and supporting the top portion. A circuit board contained within the interior storage compartment and containing a terminal block, and an antenna for detecting the ions extends from the top portion. A power supply is connected to the terminal block for supplying power to the apparatus, and a bore contained within the housing for receiving a power supply.

According to yet another embodiment of the present invention, the apparatus for the detection of ions includes a housing containing a top portion and a bottom portion, wherein the bottom portion contains a base that extends to an outer edge from which first and second pairs of spaced-apart, opposed sidewalls project upwards from the outer edge to collectively form an interior storage compartment therein. The sidewalls each have an inner and outer sidewall surfaces and each of the second pair of sidewalls interconnect the first pair of sidewalls to define corners and an interior storage compartment and an upper rim is contained on each sidewall for engaging and supporting the top portion. The circuit board is contained within the interior storage compartment and contains a terminal block, a detector circuit, a relay circuit, and a power supply circuit, and an antenna for detecting the ions extends from the top portion. A power supply connected to the terminal block for supplying power to the apparatus, and a bore is contained within the housing for receiving a power supply.

According to yet another embodiment of the present invention, the apparatus for the detection of ions includes an LED for indicating when power is supplied to the terminal block.

According to yet another embodiment of the present invention, the apparatus for the detection of ions includes an LED for indicating when a predetermined ionization level has been detected by the antenna.

According to yet another embodiment of the present invention, the apparatus for the detection of ions includes at least one potentiometer for selecting the predetermined ion level that is movable within the clockwise and counterclockwise position to increase and decrease the intensity levels.

According to yet another embodiment of the present invention, the apparatus for the detection of ions includes at least one control relay for conveying the ion level detected by the antenna.

According to yet another embodiment of the present invention, the apparatus for the detection of ions includes a control relay for conveying the ion level to a building management system through dry contacts or a standard HVAC industry communication protocol, including, but not limited to, BACnet or Modbus.

BRIEF DESCRIPTION OF THE DRAWINGS

The present invention is illustrated and described herein with reference to the various drawings, in which like reference numbers denote like method steps and/or system components, respectively, and in which.

Like reference symbols in the various figures indicate like elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", bottom", "upper", lower", "under", "over", "front", "back", "outward", "inward", "up" and "down", and "first" and "second" may be used in this disclosure, it should be understood that those terms are used in their relative sense only unless otherwise noted.

DETAILED DESCRIPTION OF THE INVENTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
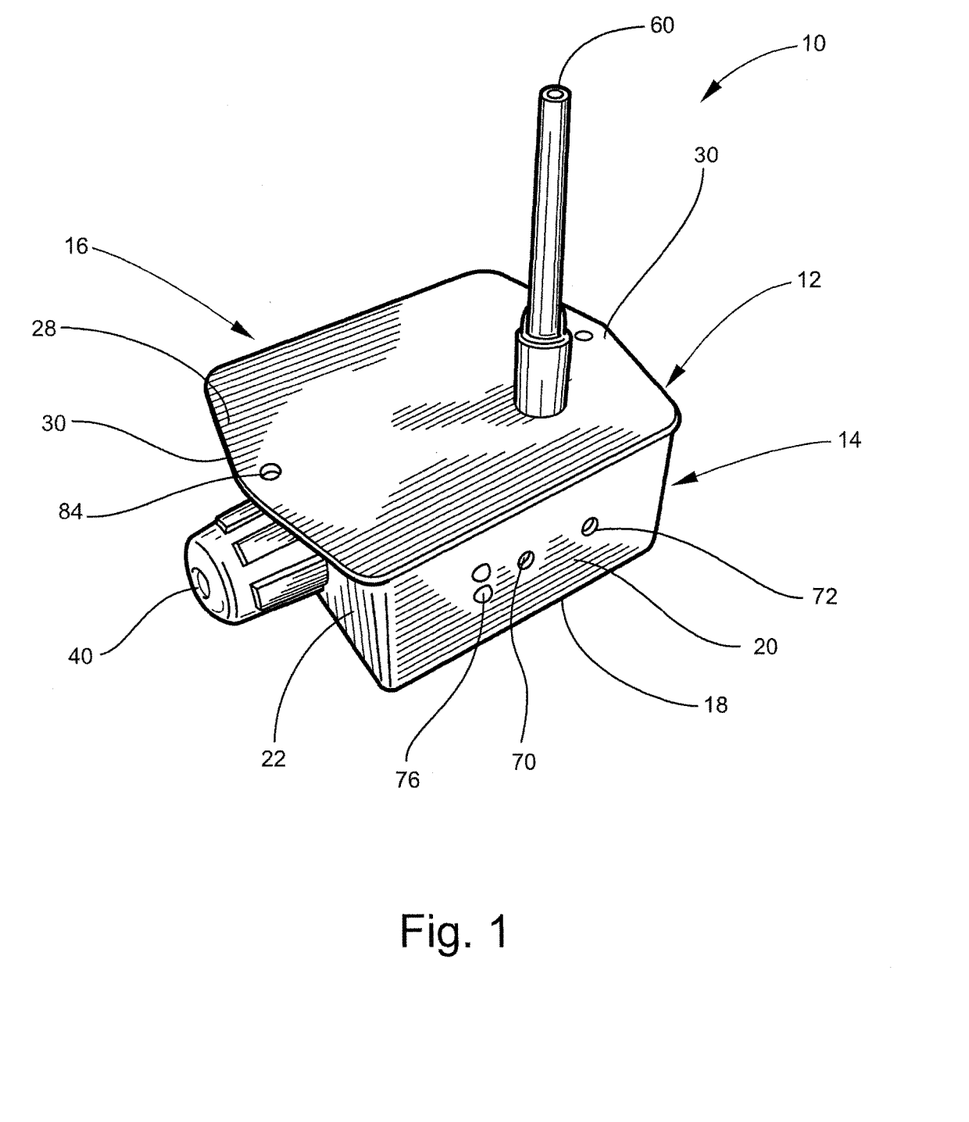
FIG. 1 is a perspective view of the ion detector.
Figure 2:
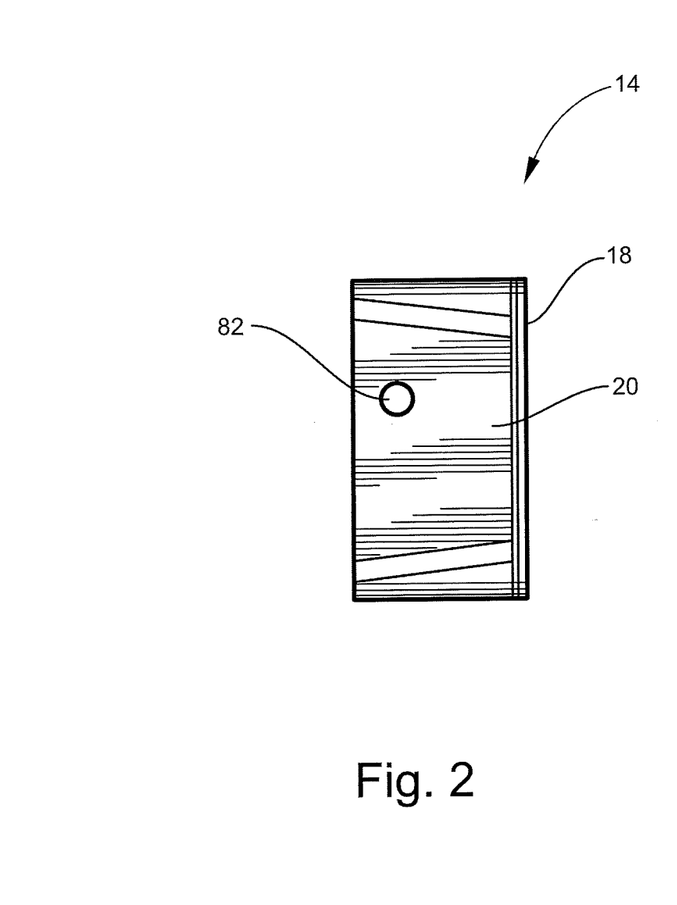
FIG. 2 is a top view of the bottom portion of the ion detector.
Figure 3:
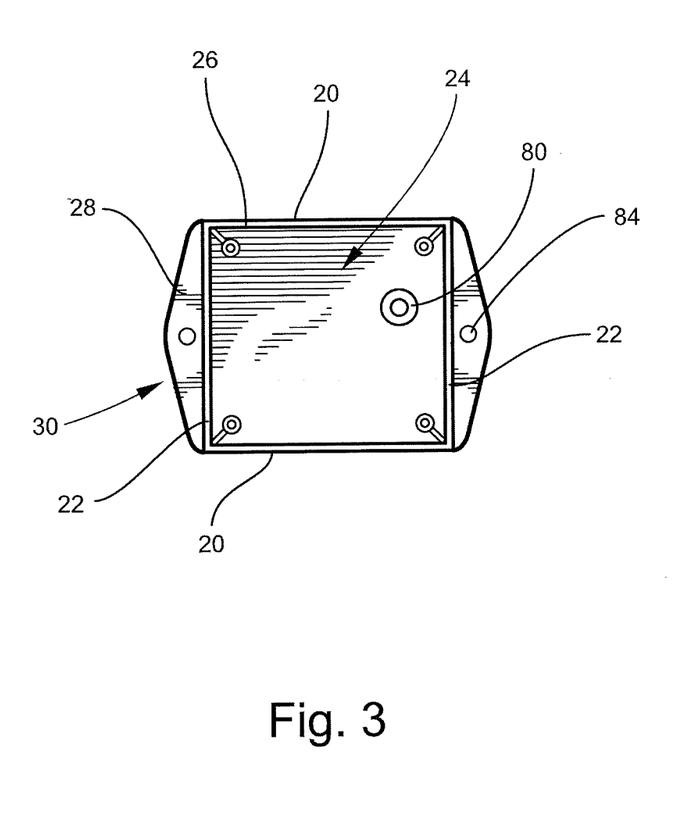
FIG. 3 is a side view of the ion detector.

Referring now specifically to the drawings, an improved ion detector is illustrated in FIG. 1 and is shown generally at reference numeral 10. More specifically, the improved ion detector enables sampling in a cost effective and efficient manner of air moving through a partially confined location, such as an air duct or other HVAC equipment, to measure ion levels within the air. The ion detector 10 may be used in numerous applications where the measurement of ions or ion flow is desirable. In one embodiment of the present invention, the ion detector 10 may be used to measure ion flow through an air duct. Those skilled in the art will be aware of uses and modifications for various air flows containing ions that the present ion detector 10 may be utilized.

Figure 4:
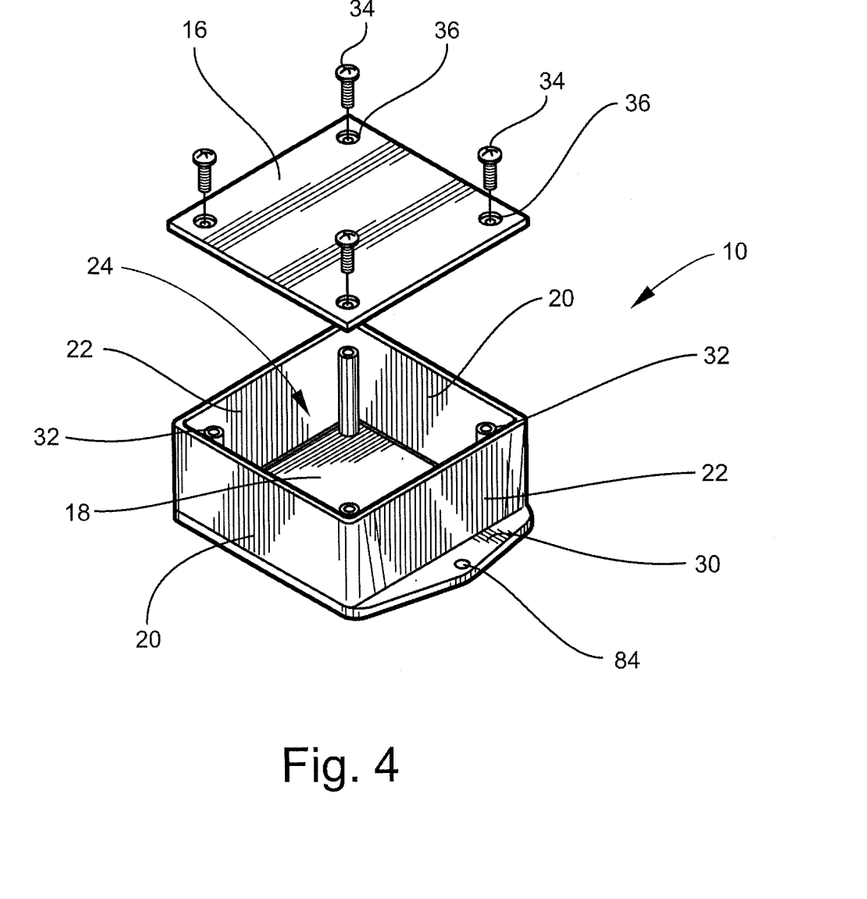
FIG. 4 is an exploded view of an alternative embodiment of the ion detector.

In a traditional operating environment, the ion detector 10 of the present invention is engaged to the exterior of an HVAC duct. As illustrated in FIGS. 1-4, the ion detector 10 contains a housing 12 consisting of a bottom portion 14 and a top portion 16. The bottom portion 14 contains a base 18 that extends to an outer edge from which first and second pairs of spaced-apart, opposed sidewalls (20, 22) project upwards from the outer edge to collectively form an interior storage compartment 24 therein. The first pair of spaced-apart, opposed sidewalls 20 and second pair of spaced-apart, opposed sidewalls 22 each have an inner sidewall surface and an outer sidewall surface and each of the second pair of sidewalls interconnects the first pair of sidewalls to define corners and the interior storage compartment 24. An upper rim 26 is contained on each sidewall (20, 22) for engaging and supporting the top portion 16. In one embodiment, the base 18 may extend beyond at least one outer sidewall surface forming a mounting element 30 for engaging the ion detector to an air flow structure, such as an HVAC duct, as illustrated in FIG. 4. According to another embodiment, the ion detector 10 may have a mounting element 30 that is a flange 28 that extends from the upper rim 26 of the bottom portion 14, as illustrated in FIG. 1. The top portion 16 may also contain a corresponding flange 28 that fits overtop the flange 28 of the bottom portion 14. The flange 28 or mounting element 30 may be an extension and designed for engaging the ion detector 10 to an air flow structure, such as an HVAC duct.

A hollow cylindrical structure 32 is disposed in the interior storage compartment 24 adjacent at least one corner formed by the intersection of a first sidewall 20 and a second sidewall 22. The hollow cylindrical structure 32 may be internally threaded for receiving a correspondingly threaded attachment means 34, such as a screw, bolt, or the like. The top portion 16 may be a parallelogram. As illustrated in FIGS. 1 and 4, the top portion 16 is generally square. The top portion 16 may contain at least one bore 36 positioned in close proximity to at least one corner of the top portion 16. As illustrated in FIGS. 1 and 4, the top portion 16 may contain four bores 36 positioned in close proximity to the four corners of the top portion 16. The bore 36 may be internally threaded for receiving a correspondingly threaded attachment means 34, such as a screw, bolt, or the like. The attachment means 34 is correspondingly threaded with the hollow cylindrical structure 32 for forming a selectively secured arrangement between the top portion 16 and the bottom portion 14. The attachment means 34 extends through the bore 36 of the top portion 16 and into the hollow cylindrical structure 32 forming the selectively secured arrangement. A circuit board 38 comprising circuitry for the ion detector 10 is enclosed within the interior storage compartment 24 of the housing 12, wherein the bottom portion 14 and top portion 16 are selectively secured to protect the circuit board 38 from damage.

Figure 5:
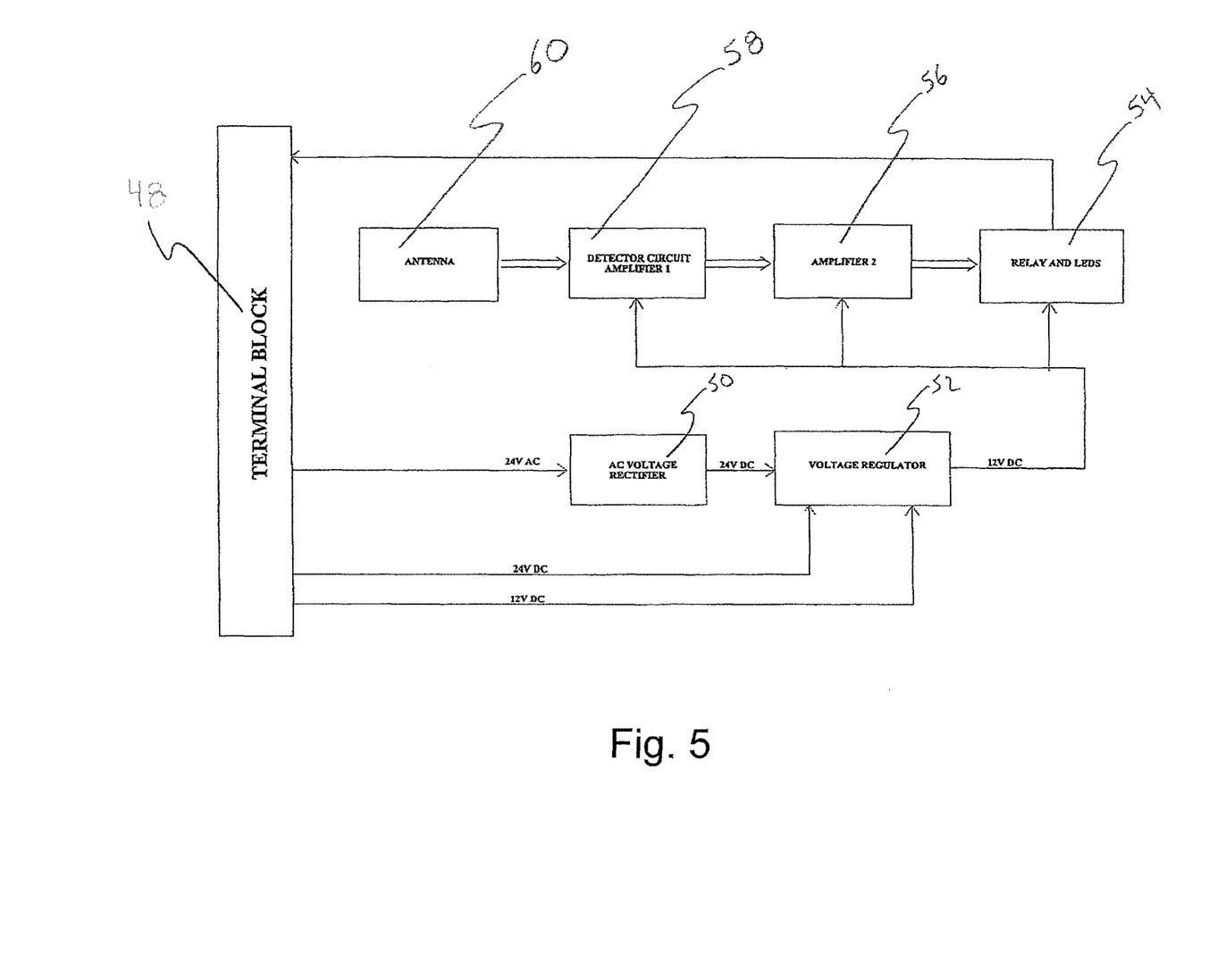
FIG. 5 is a circuit diagram of the ion detector.
Figure 6:
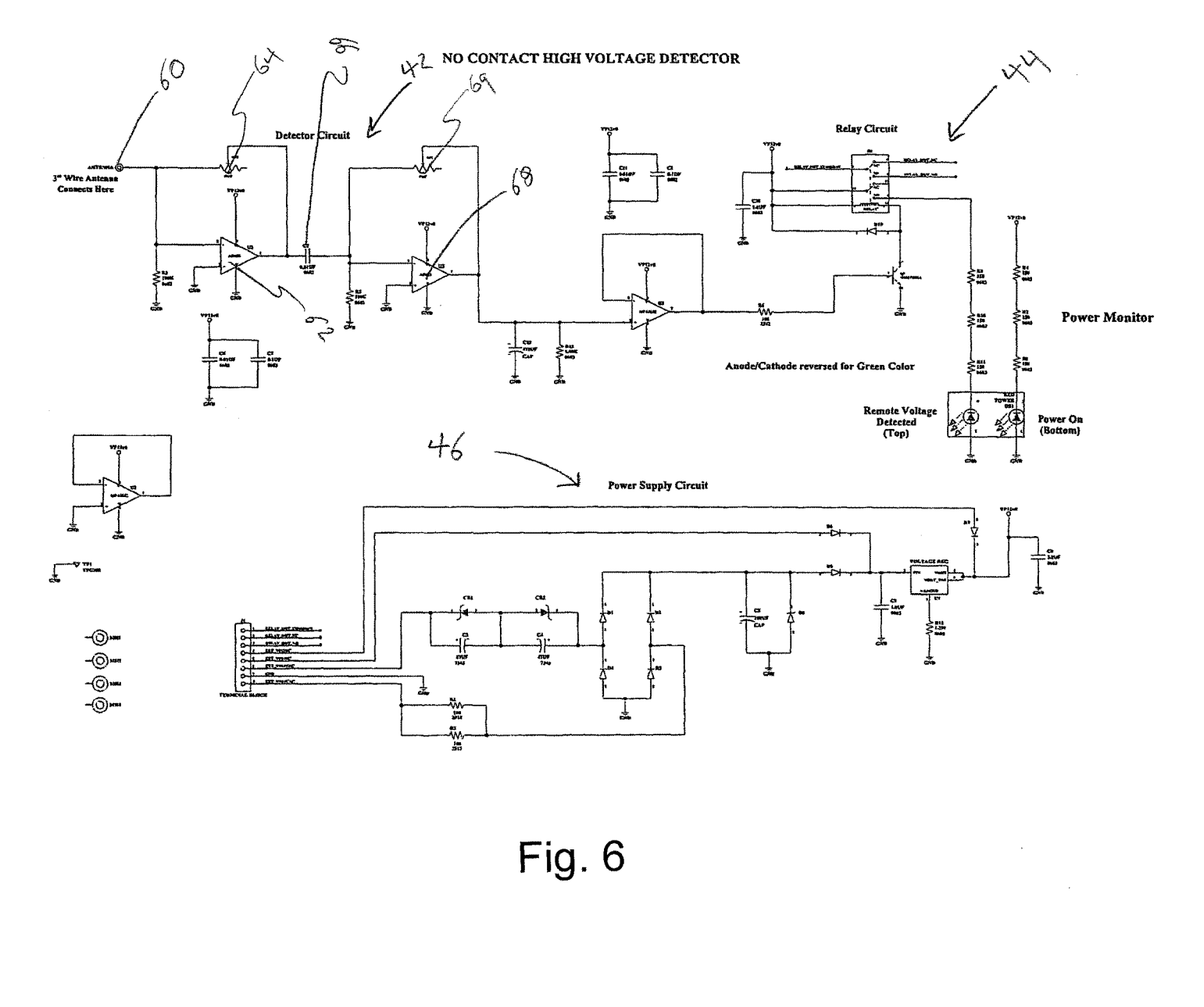
FIG. 6 contain the circuit diagrams for the detector circuit, relay circuit, and power supply circuit of the ion detector.

An electrical supply entry point 40 is formed within the housing 12. As illustrated in FIG. 1, the electrical supply entry point 40 is disposed in one of the sidewalls (20, 22) for allowing the power supply 86 to be inserted into the housing 12 and engaged to the circuit board 38. As illustrated in FIGS. 5 and 6, the circuit board 38 contains at least three circuits, including a detector circuit 42, relay circuit 44, and power supply circuit 46. The circuit board 38 comprises the circuitry for the ion detector 10. As shown in FIGS. 5 and 6, the circuit board 38 is configured to accept a power supply 86 at one end of the power supply 86 and the opposing end of the power supply 86 is connected directly or indirectly to an electrical connector receiving an electrical current from a source such as an electrical outlet.

Referring now specifically to FIG. 5 of the accompanying drawings, there is illustrated the general circuit diagram for the ion detector 10. The circuit board 38 carries a terminal block 48 that creates a bus bar for power distribution. The terminal block 48 may also include a master input connector, such as binding posts or banana connectors. An output from the terminal block 48 proceeds to an AC voltage rectifier. Preferably, this output is a 24 volt alternating current. A first output and a second output proceeds from the terminal block 48 to a voltage regulator 52. Preferably, the first output is a 24 volt direct current and the second output is a 12 volt direct current. An output from the AC voltage rectifier 50 proceeds to the voltage regulator 52, and preferably the output is a 24 volt direct current. An output proceeds from the voltage regulator 52 and proceeds to a relay and LED(s) 54, a second amplifier 56, and a detector circuit and first amplifier 58. Preferably this output is a 12 volt direct current.

Figure 7:
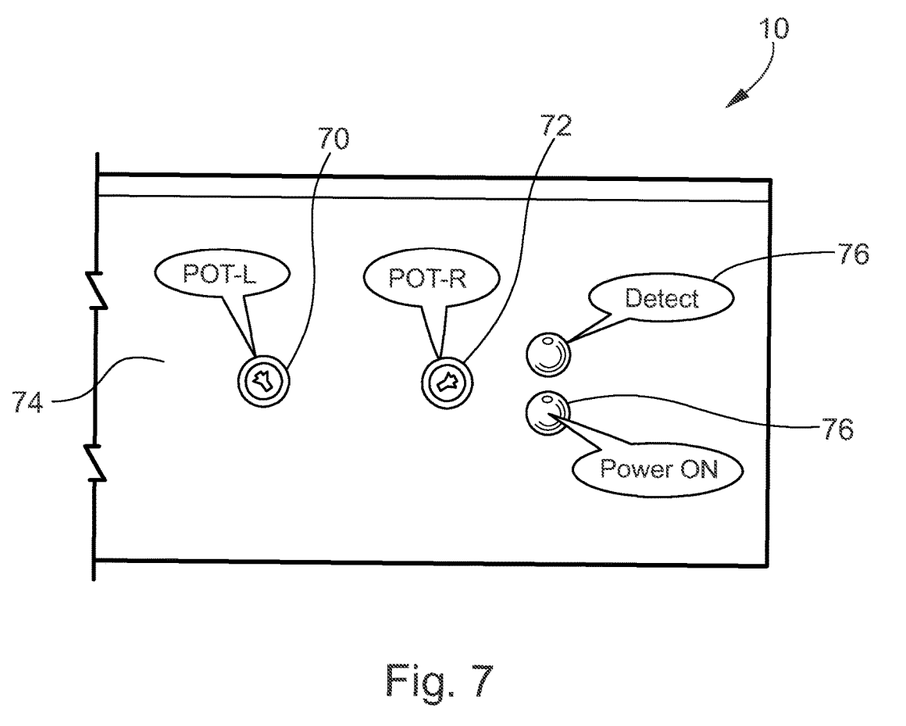
FIG. 7 is a side view of the housing of the ion detector showing the LEDs and Potentiometers.

As illustrated in FIG. 7, the housing includes two LEDs 76 that serve as status identifiers for the ion detector device 10. One of the LEDs 76 is a power indicator that illuminates when power is supplied to the ion detector device 10 and is not illuminated when power is not supplied to the ion detector device 10. The second LED 76 is lit when a predetermined ion count has been reached. When the second LED 76 is not illuminated, the ion count detected by the ion detector device 10 is below a predetermined ion level.

An antenna 60 extends substantially perpendicularly from the housing 12 and is communicatively connected to the detector circuit 42 on the circuit board 38. As shown, the antenna 60 extends substantially perpendicularly from the top portion 16. In one embodiment, the antenna 60 is a plastic extension containing a copper wire that serves as a detector of ions. The plastic coating assists in protecting the copper wire and preventing the copper wire from contacting the HVAC duct or any other metal product. The copper wire of the antenna 60 senses the voltage in the air, and thus the ion count. A voltage reading in the surrounding air 60 corresponds to the presence of ions. Depending upon the level of voltage detected, the ion concentration may be determined. In other words, the level of voltage detected is directly related to the amount of ions within the air. The greater the voltage means the greater the ion concentration.

In another embodiment, the wire may extend above the plastic extension. In yet another embodiment, the plastic extension may have at least one hole for allowing the air to contact the wire. When the antenna 60 detects the voltage in the air, and thus the ion count, the voltage detection information is transmitted to the detector circuit 42 and first amplifier 58, because the antenna 60 is communicatively connected to the detector circuit 42 and circuit board 38, and proceeds to the second amplifier 56, and then to the relay and LEDS 54 for providing a signal by illumination. At least one control relay may be utilized to convey the amount of voltage detected in the surrounding air, and thus the ion level within the air. The at least one control relay may convey the ion level to a building management system through dry contacts or a standard HVAC industry communication protocol, including, but not limited to, BACnet or Modbus.

As illustrated in FIG. 6, the detector circuit 42 consists of the antenna 60 connected to a terminal of diode 62. The other connection point of the diode is connected to ground. A feedback network, consisting of a resistor 64, is connected to the diode 62 and the output is collectively connected to a non-polarized capacitor 66. The output from the non-polarized capacitor 66 proceeds to a terminal of a diode 68. The other connection point of the diode is connected to ground. A feedback network, consisting of a resistor 69, is connected to the diode 68 and the output is collectively connected to the relay circuit 44, as illustrated in FIG. 6.

The ion detector 10 can be adjusted to decrease or increase the sensitivity of the ion concentration levels for detection by the antenna 60. As illustrated in FIG. 7, the ion detector 10 has two potentiometers (pots), and as illustrated, has a left pot (Pot-L) 70 and a right pot (Pot-R) 72. Each pot (70, 72) has an adjustment slot 74 and low sensitivity is set by turning the pots (70,72) counterclockwise to their predetermined limit and full sensitivity is attained by turning each pot (70,72) clockwise to a predetermined limit. The adjustment slot 74 disposed on each pot (70,72) is designed to receive an object than can be rotated to turn the pot (70, 72). The pot (70,72) may be recessed within the housing 12 as illustrated in FIG. 7. The pot (70,72) may have an arrowhead adjustment slot 74 that serves as a reference point. Table 1, reproduced below, indicates an exemplary setting used to detect certain DC voltages with the position of each pot (70,72) in reference to the face of a clock (e.g. a setting of 12 means that the arrowhead of the adjustment slot 74 is pointing straight up when viewing the housing 12 from the top).

TABLE 1

Approximate Setting for Tested Voltages

| Detected Voltage | Setting for a Solid "Detect" | |
| --- | --- | --- |
| | Pot-L | Pot-R |
| 3000 | 10 | 11 |
| 900 | 9 | 8 |
| 650 | 9 | 9 |
| 356 | 3 | 8 |
| 322 | 10.5 | 7 |
| 280 | 10 | 7 |
| 227 | 10 | 7 |
| 162 | 10 | 7 |
| 120 | 5 | 8 |

In one embodiment, the ion count or ionization level can mean the amount of ions, measured by the number of ions detected in a certain time period. In another embodiment, the ion count or ionization level may be any amount of ions measured by the number of ions detected for a given air flow. When the predetermined ionization level has been reached, the detector circuit 58 sends a signal through the relay circuit 44 and activates an LED 76 disposed on the housing 12 of the ion detector 10. The LED 76 indicates that the predetermined ionization level has been reached. A second LED 76 indicates the status of power flowing to the device. When power is flowing into the device, the second LED 76 is in the "on" position and the light is illuminated. A switch is contained within the device 10 for controlling the flow of power into the device 10.

In another embodiment of the present invention, the detector circuit 42 may send a signal through the relay circuit 44 that activates an audio alarm that transmits sound through a speaker 80 for indicating that the predetermined ionization level has been reached. The speaker may be disposed within the interior storage compartment 24 and transmit a signal through openings 82 in the housing 12. In other words, the detector circuit 42 transmits a value that is representative of the ion count based upon the voltage detected in the airflow passing by the antenna 60. The detector circuit 42 makes a determination based upon the position of the pots (70,72) to determine whether the predetermined ion count or ionization level has been reached. If the level has been reached, the LED 76 is turned to the "on" position and is illuminated. If the level has not been reached, the LED 76 stays in the "off" position and is not illuminated. In addition to or in lieu of an LED 76, the alarm may sound through the speaker 80 if the level has been reached.

The mounting element 30 is designed to assist in engaging the ion detector 10 to an air flow structure, such as an HVAC duct. Preferably, the mounting element 30 contains a bore 84 for receiving an attachment means 34 for engaging the mounting element 30 of the ion detector 10 to the air flow structure. In one embodiment, the bore 84 of the mounting element 30 is threaded for receiving a correspondingly threaded attachment means 34, such as a screw or bolt for securing the ion detector 10 to the air flow structure.

In one embodiment, the antenna 60 is designed to protrude through an opening within the air flow structure, such as an HVAC duct, while the housing 12 remains and is engaged to the exterior of the air flow structure. Preferably, the opening within the air flow structure has a diameter slightly larger than the diameter of the antenna 60. The housing 12 is preferably composed of plastic and serves as an insulator for preventing any short circuiting of the electrical components.

Figure 8:
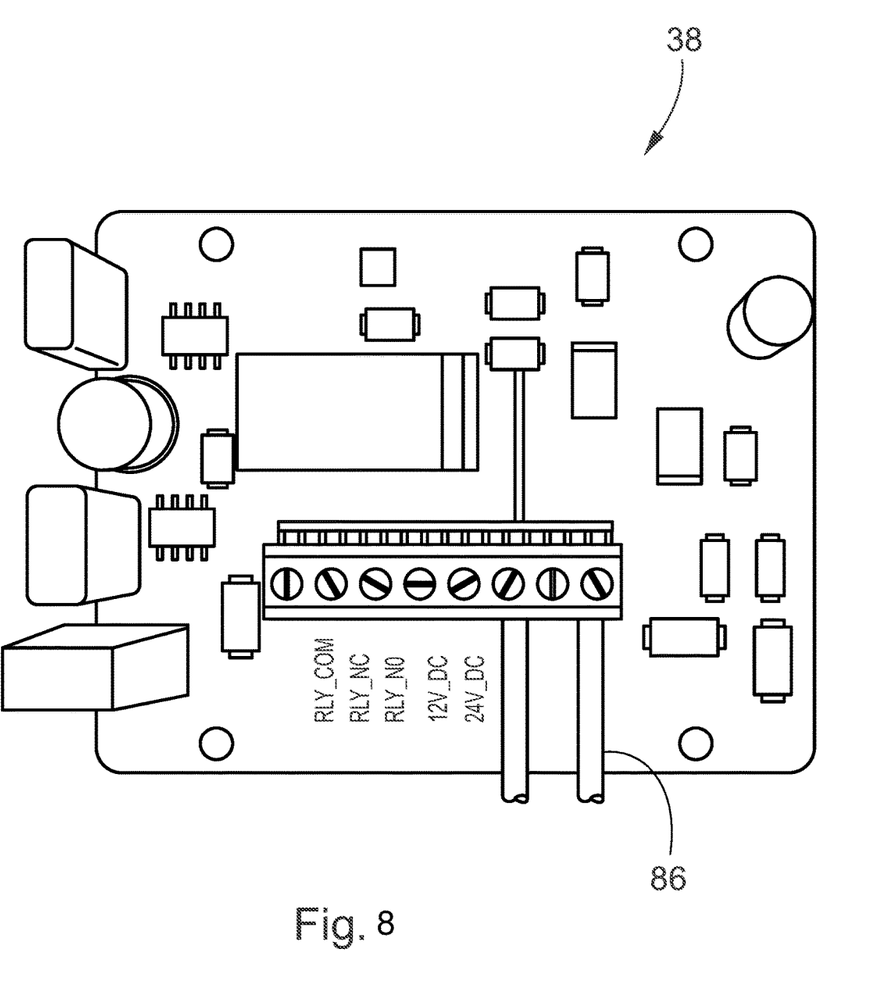
FIG. 8 is a top view of the circuit board.

FIG. 8 illustrates an embodiment of the circuit board 38. As shown, a power supply 86 is connected to the terminal block 48 at the appropriate power input pins. The circuit board 38 is clearly marked with the external connection values with the appropriate power input pins of the terminal block 48.

There are many uses for the ion detector device 10 of the present invention. The ion detector device 10 may be placed downstream of a filter and affixed to a portion of the frame so as detect ions precipitating downstream. This would allow one to determine if a filter is not in place, not properly in place, or if the filter is damaged. This would also allow one to know if an ionization device contained within the HVAC system is producing the requisite amount of ions, and thus indicating if the requisite amount of ions are not being produced that the ionization device is not set-up correctly, faulty, or damaged.

The use of the ion detector device 10 in an HVAC system is not designed to limit the present invention. An ion detector device 10 consistent with the present invention may be used anywhere where the detection of ions would be beneficial to control process conditions or protect ion sensitive equipment, devices, or systems.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An apparatus for the detection of ions, comprising:
   a housing with a top portion and a bottom portion and containing an interior storage compartment;
   a circuit board contained within the interior storage compartment;
   a detector circuit;
   an antenna capturing data on the number of ions extending in the air passing around the antenna, the antenna extends substantially perpendicularly from the top portion of the housing, the antenna is communicatively coupled to the detector circuit and consists of a copper wire with a plastic coating for protecting the copper wire;
   a switch for controlling the flow of power to the device;
   a feedback network consisted of a resistor and connected to a diode and an output collectively to a relay circuit;
   at least one potentiometer recessed within the housing;
   a relay circuit contained on the circuit board for relaying the data captured by the antenna; and
   a mounting element formed from the bases extending beyond at least one outer sidewall surface and containing a bore therein.

2. The apparatus of claim 1, further comprising an LED for indicating when power is supplied to the apparatus.

3. The apparatus of claim 1, further comprising an LED for indicating when a predetermined ionization level has been reached.

4. The apparatus of claim 1, further comprising an arrowhead adjustment slot on the at least one potentiometer.

5. The apparatus of claim 1, further comprising an attachment device on the housing.

6. The apparatus of claim 1, further comprising at least one hollow cylindrical structure contained within the interior storage compartment.

7. The apparatus of claim 1, further comprising at least one control relay for conveying the ion output status.

8. The apparatus of claim 1, further comprising a control relay for conveying the ion output status to a building management system through dry contacts or a standard HVAC industry communication protocol including, but not limited to, BACnet or Modbus.

9. An apparatus for the detection of ions, comprising:
   a housing containing a top portion and a bottom portion, wherein the bottom portion contains a base that extends to an outer edge from which first and second pairs of spaced-apart, opposed sidewalls project upwards from the outer edge to collectively form an interior storage compartment therein, the sidewalls each have an inner and outer sidewall surfaces and each of the second pair of sidewalls interconnect the first pair of sidewalls to define corners and an interior storage compartment and an upper rim is contained on each sidewall for engaging and supporting the top portion;
   a circuit board contained within the interior storage compartment;
   a detector circuit;
   an antenna that extends substantially perpendicularly from the top portion of the housing, the antenna is communicatively coupled to the detector circuit and consists of a copper wire with a plastic coating for protecting the copper wire;
   a switch contained within the device to control the flow of power to the device;
   a feedback network consisted of a resistor to connect to a diode and an output collectively to a relay circuit;
   two potentiometers recessed within the housing and containing an adjustment slot on the at least one potentiometer;
   a power supply supplies power to the apparatus;
   a mounting element formed from the base extending beyond at least one outer sidewall surface and containing a bore therein.

10. The apparatus of claim 9, further comprising an LED for indicating when power is supplied to the apparatus.

11. The apparatus of claim 9, further comprising an LED for indicating when a predetermined ionization level has been reached.

12. The apparatus of claim 9, wherein the adjustment slot is an arrowhead adjustment slot.

13. The apparatus of claim 9, further comprising a speaker.

14. The apparatus of claim 9, further comprising at least two hollow cylindrical structures disposed within the interior storage compartment.

15. An apparatus for the detection of ions, comprising:
a housing containing a top portion and a bottom portion, wherein the bottom portion contains a base that extends to an outer edge from which first and second pairs of spaced-apart, opposed sidewalls project upwards from the outer edge to collectively form an interior storage compartment therein, the sidewalls each have an inner and outer sidewall surfaces and each of the second pair of sidewalls interconnect the first pair of sidewalls to define corners and an interior storage compartment and an upper rim is contained on each sidewall for engaging and supporting the top portion;
a circuit board contained within the interior storage compartment and containing a terminal block, a detector circuit, a relay circuit, and a distributed power supply circuit;
an antenna that extends substantially perpendicularly from the top portion of the housing, the antenna is communicatively coupled to the detector circuit and consists of a copper wire with a plastic coating for protecting the copper wire;
a power supply connected to the terminal block for supplying power to the apparatus;
at least one potentiometer recessed within the housing and an adjustment slot on the at least one potentiometer; and
a bore contained within the housing for receiving a power supply.

16. The apparatus of claim 15, further comprising an LED for indicating when power is supplied to the terminal block.

17. The apparatus of claim 15, further comprising an LED for indicating when a predetermined ionization level has been detected by the antenna.

18. The apparatus of claim 15, further comprising a lower rim engaged to the base of the bottom portion for engaging the apparatus to an HVAC duct.

19. The apparatus of claim 15, further comprising at least two hollow cylindrical structures engaged to the bottom portion.

* * * * *

UNITED STATES PATENT AND TRADEMARK OFFICE
CERTIFICATE OF CORRECTION

| | |
|---|---|
| PATENT NO. | : 10,073,055 B2 |
| APPLICATION NO. | : 14/165071 |
| DATED | : September 11, 2018 |
| INVENTOR(S) | : Waddell |

It is certified that error appears in the above-identified patent and that said Letters Patent is hereby corrected as shown below:

On the Title Page

Column 1, item (60) Related U.S. Application Data:
Change "Provisional application No. 61/756,591, filed on Jan. 25, 2013" to This application claims the benefit of Provisional application No. 61/756,591, filed on Jan. 25, 2013.

Signed and Sealed this
Thirteenth Day of November, 2018

Andrei Iancu
*Director of the United States Patent and Trademark Office*

Page 1 of 1